United States Patent [19]
Spooner et al.

[11] Patent Number: 5,836,207
[45] Date of Patent: Nov. 17, 1998

[54] RATIO SELECTOR MECHANISMS

[75] Inventors: John Spooner; Mark Stanley Willows, both of Kenilworth; David Anthony Harries, Welford on Avon, all of Great Britain

[73] Assignee: Kongsberg Techmatic UK Limited, Leamington SPA, England

[21] Appl. No.: 809,997

[22] PCT Filed: Jul. 19, 1996

[86] PCT No.: PCT/GB96/01732

§ 371 Date: Mar. 17, 1997

§ 102(e) Date: Mar. 17, 1997

[87] PCT Pub. No.: WO97/05410

PCT Pub. Date: Feb. 13, 1997

[30] Foreign Application Priority Data

Jul. 26, 1995 [GB] United Kingdom .................... 9515333
Feb. 10, 1996 [GB] United Kingdom .................... 9602734

[51] Int. Cl.⁶ .................................................. F16H 61/28
[52] U.S. Cl. ................................................................ 74/335
[58] Field of Search .............................. 74/335, 473–11

[56] References Cited

U.S. PATENT DOCUMENTS 5,138,905  8/1992  Kouno ....................................... 74/335
5,224,392  7/1993  Hutchison et al. ........................ 74/335
5,231,895  8/1993  Stine ......................................... 74/335
5,697,251  12/1997  Lorriette et al. .......................... 74/335

FOREIGN PATENT DOCUMENTS

0059853  9/1982  European Pat. Off. .
0378218  7/1990  European Pat. Off. .
0477564  4/1992  European Pat. Off. .
2214248  8/1989  United Kingdom .

Primary Examiner—Dirk Wright
Attorney, Agent, or Firm—Paul E. Milliken; Lee A. Germain

[57] ABSTRACT

A ratio selector mechanism for the selection of the operative ratio in an associated synchromesh vehicle transmission in which a fluid pressure operated actuator operates synchromesh units. The operating pressure of the actuator is varied either mechanically or electronically during selection of a given ratio in the associated transmission or dependent on the ratio being selected. A first actuator selects a shift rail, and a second actuator engages a gear. A valve member acts against a bias force which is varied based on the position of the first actuator to control the pressure in the second actuator.

11 Claims, 7 Drawing Sheets

RATIO SELECTOR MECHANISMS

This invention relates to ratio selector mechanisms and in particular to such mechanisms for the selection of the operative ratio in a vehicle transmission.

Selector mechanisms, hereinafter referred to as bearing "of the type specified", are known in which a fluid pressure operated actuating means operates synchromesh units in an associated synchromesh vehicle transmission.

It is an object of the present invention to provide an improved from of selector mechanism of the type specified.

Thus according to the present invention there is provided a selector mechanism of the type specified in which the operating pressure of the actuating means is varied during selection of a given ratio in the associated transmission or dependant on the ratio being selected in the associated transmission.

For example, the operating pressure may be lowered when selecting the higher ratios of the associated transmission.

In one form of the invention the actuating means comprises a first fluid pressure operated actuator which moves a selector member in a first direction to engage one of a number of ratio shift rails and a second fluid pressure operated actuator which moves the selector member in a second direction to longitudinally displace the engaged shift rail to engage an associated selected ratio.

The level of fluid pressure applied to the second actuator may be varied dependent on the position of the first actuator.

Using such an arrangement the pressure applied to the second actuator (which determines the force used in actually engaging the selected ratio) can be lowered when the first actuator is in engagement with the selector rail(s) associated with the higher ratios of the associated vehicle transmission. This is particularly advantageous in synchromesh transmissions where the synchromesh units associated with the higher ratios are normally of a smaller diameter and therefore less powerful as they have a small speed differential to accommodate.

In a preferred arrangement the level of pressure supplied to the second actuator may be controlled by a valve member which acts against a bias force which is varied in dependence on the position of the first actuator.

Conveniently the above arrangement can be provided by an abutment which moves with the first actuator and which bears on a spring which biases the valve member towards a closed position, movement of the first actuator thus varying the effective bias force of the spring.

In an alternative arrangement pressure is supplied to the actuating means via a master control valve which operates as a solenoid-operated proportional pressure regulating valve which outputs fluid at a pressure proportional to a signal (solenoid current) issued to an electronic control means in accordance with predetermined transmission or vehicle operating criteria.

In a still further alternative arrangement the master control valve may be a solenoid-operated proportional flow valve and a pressure transducer is provided which senses the pressure level supplied to the actuating means and whose output is fed to an electronic control means which issues signals to the solenoid of the master control valve to control the actuating means pressure in accordance with predetermined transmissin or vehicle operating criteria.

The advantage of such electronically controlled arrangements are that the pressure supplied to the selector actuators can be controlled by the master control valve not only in dependence on the ratio to be engaged but also in accordance with additional criteria such as:

A) a requirement to use a different shift loads on one or more synchros in a given transmission which are of a different design to other synchros used in the same transmission;

B) a requirement to have a higher shift load when changing down. This load could be arranged to be higher than the transmission member sustain permanently but which might be required during kickdown in a fully automated transmission which used synchromesh units;

C) a requirement to have a shift load which is sensitive to a selected mode of operation of the associated transmission. For example, if the transmission is operating in "sport" mode quicker and noisier shifts are acceptable than when operating in for example, an "economy" or "winter" mode, and D) a requirement to vary shift load at different points in a given shifting cycle. For example, the shift load may be arranged to be lower up to the point at which the synchronising components come into contact and then higher to actually achieve synchronisation. Alternatively, there may be a requirement to pull out of engagement with a lower shift load than is used for engagement or vice versa.

As indicated above, the pressure supplied to the actuators can easily be varied at any point in a shift cycle by varying the signal applied to the master control valve.

The present invention will now be described, by way of example only, with reference to the accompanying drawings in which.

Figure 1:
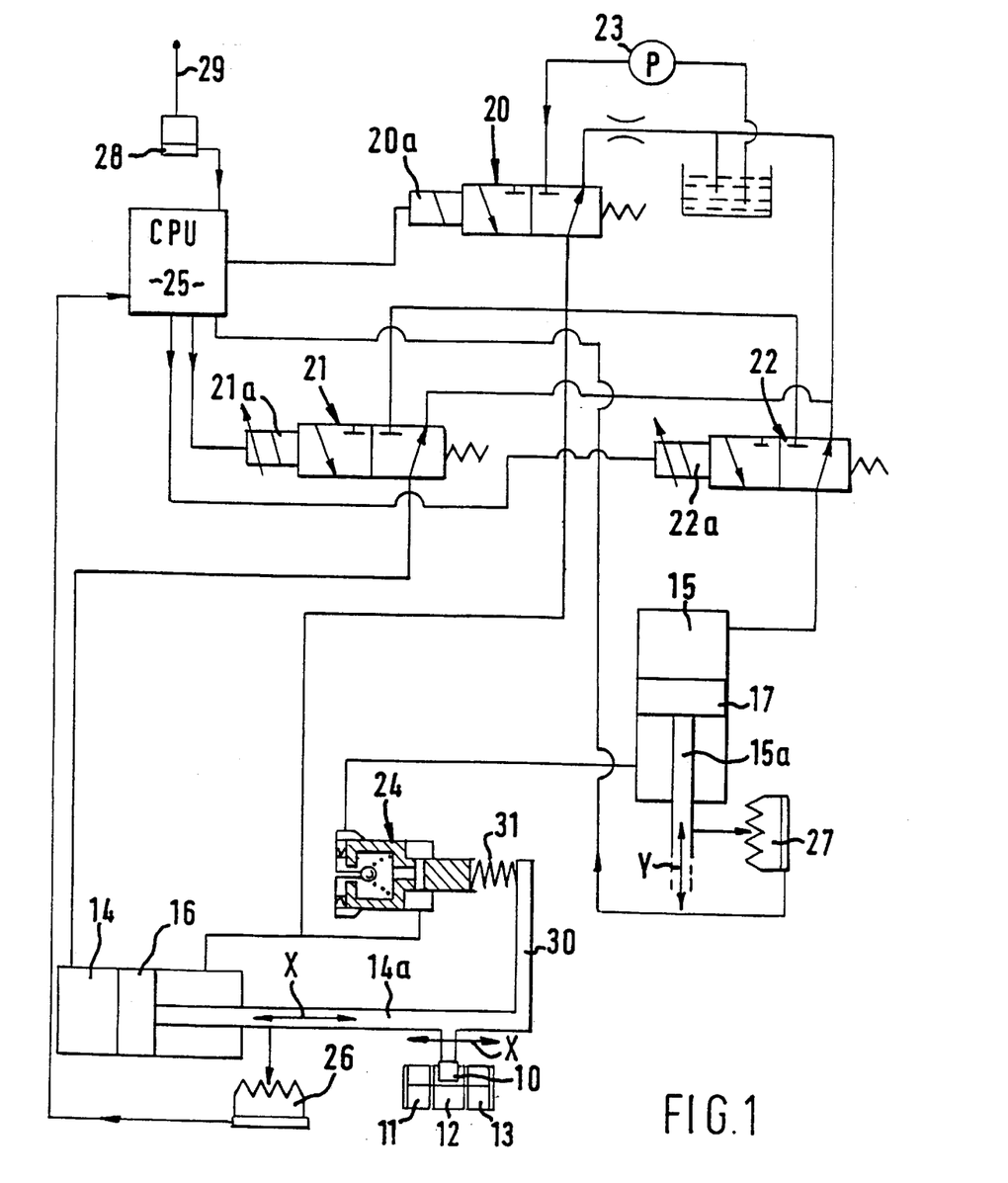
FIG. 1 diagrammatically illustrates a vehicle transmission ratio selector mechanism in accordance with the present invention.
Figure 2:
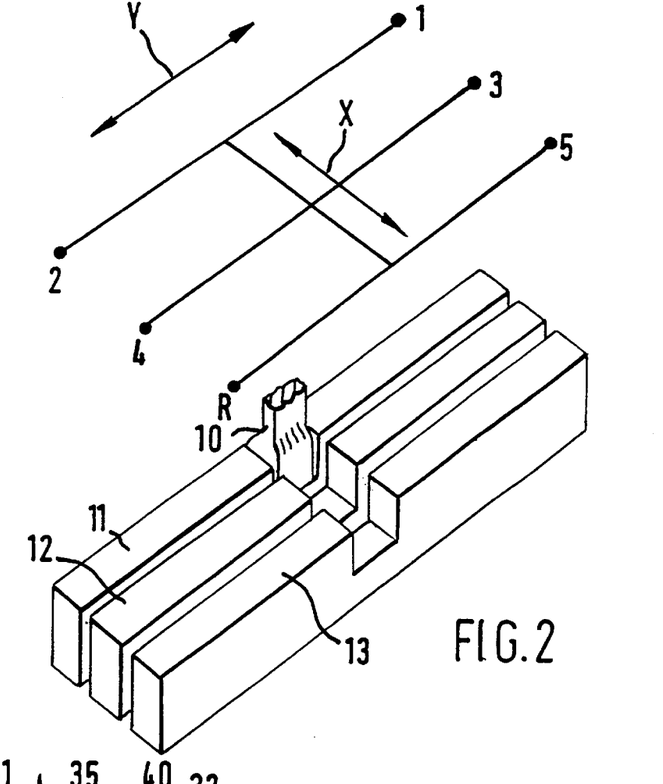
FIG. 2 shows a ratio selection gate and associated shift rails used in the mechanism of FIG. 1.

Referring to FIG. 1 this shows diagrammatically a gear selector mechanism in accordance with the present invention in which a selector member 10 is engageable with three shift rails 11,12 and 13 which engage ratios in an associated vehicle transmission using the shift gate shown in FIG. 2. The shift rail 11 engages ratios 1 and 2, shift rail 12 engages ratios 3 and 4, and shift rail 13 engages ratio 5 and reverse.

The selector member 10 is movable in a first direction X by a first fluid pressure operated actuator 14 and in a second direction Y by a second fluid pressure operated actuator 15. Thus by a combination of the movements of the first and second actuators 14 and 15 the selector member 10 can be engaged with the required shift rail 11,12 or 13 and move in direction Y to engage the desired ratio associated with the currently engaged shift rail.

The actuators 14 and 15 each comprise a double-acting ram with an operating rod 14a and 15a respectively which is operatively connected with the selector member 10. As will be appreciated, the presence of the operating rods 14a and 15a results in piston 16 of actuator 14 having a rod side effective area which is less than the effective area of the other head side of the piston. Similarly piston 17 of actuator 15 has a smaller rod side area. Thus if both sides of the pistons are subjected to the same fluid pressure the pistons 16 and 17 will be displaced along the actuators to extend the associated operating rods 14a and 15a.

The supply of pressure to the rod and head ends of the actuators 14 and 15 is controlled by three solenoid-operated valves 20,21 and 22. Valve 20 is a master on/off valve which receives pressurised fluid from a pump 23. Master valve 20, when in its on condition, supplies fluid to proportional flow valves 21 and 22 and also to the rod-end of each actuator 14 and 15. A pressure regulating valve 24 is provided in the connection between master valve 20 and the rod end of actuator 15. The operation of pressure reducing valve 24 will be described in detail below.

Master valve 20 and proportional flow valves 21 and 22 are all controlled from an electronic control unit 25 which not only issues electrical control signals to the solenoids 20a,21a and 22a of the valves but received signal inputs from potentiometers 26 and 27 which indicate the position of associated operating rods 14a and 15a and also a signal from a sensor 28.associated with a ratio selector lever 29 which is moved within the ratio selection gate shown in FIG. 2 to select the desired ration of the associated transmission. Thus, in response to the movement of selector lever 29 to select a desired ratio in the associated transmission, the sensor (or sensors) 28 outputs a signal to control unit 25 which is processed by control unit 25 and results in the emission of a signal to master valve 20 to move to the "on" position in which pressurised fluid is supplied to valves 21 and 22 and also to the rod end of both actuators 14 and 15.

Dependent on the required movement of selector member 10 and the associated operating rods 14a and 15a, valves 21 and 22 are operated by the control unit 25 in the appropriate sequence to give the appropriate movement of operating rods 14a and 15a in the appropriate sequence.

Initially operating rod 14a is moved in direction X to engage the appropriate shift rail followed by movement of operating rod 15a to displace the shift rail currently engaged by the selector member 10 in direction Y to engage the selected ratio.

In accordance with the present invention the fluid pressure supplied to actuator 15, which moves the shift rails 11,12 and 13 in direction Y to actually engage the selected ratio, is varied dependent on which shift rail is engaged by the selector member 10. This variation in applied pressure is achieved by the previously referred to pressure reducing valve 24.

Figure 3:
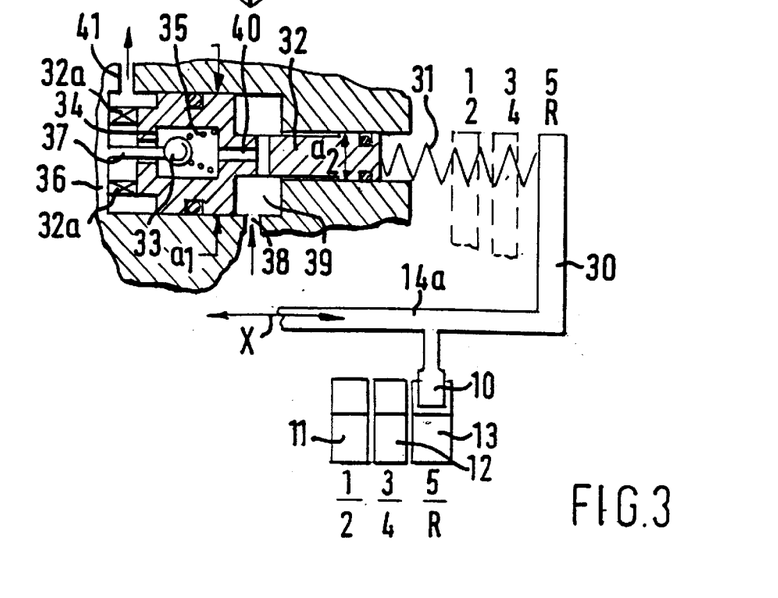
FIG. 3 diagrammatically illustrates a ball-type fluid pressure reducing valve which forms part of the selector mechanism.

As can be seen more clearly from FIG. 3, operating rod 14a has an abutment 30 connected therewith which moves with the operating rod. This abutment provides the reaction surface against which a pressure level control spring 31 acts. Pressure reducing valve 24 includes a movable piston member 32 which is acted upon by control spring 31 and within which a ball valve 33 is biased against a seat 34 provided on the piston member 32 by a spring 35. The end of bore 36 within which piston member 32 slides is provided with a projection 37 which extends through seat 34 to unseat ball valve 33 and piston 32 is held away from the end of bore 36 by spacers 32a on the piston.

With the valve 24 in the position shown in FIG. 3, ball valve 33 is unseated and pressure is free to flow from master valve 20 via inlet port 38 chamber 39 drilling 40 valve seats 34 and outlet port 41 to the rod end of actuator 15.

As the pressure entering valve 24 via inlet port 38 rises, because of the differential area of piston 32 (which is equal to the larger area a1 minus the smaller area a2) there is a net hydraulic force acting on piston 32 to the right, as viewed in FIG. 3, against the action of spring 31. When the pressure level within bore 36 acting on area a1–a2 results in a force greater than the force applied to piston 32 by spring 31 the piston 32 is moved to the right so that ball-valve 33 engages seat 34 to close-off the flow of fluid through the valve to the rod end of actuator 15 thus controlling the level of pressure supplied to the rod end of actuator 15 and hence the force applied by actuator 15 to the associated synchromesh units.

Any further increase in the fluid pressure entering the chamber 39 of reducing valve 24 will tend to produce a hydraulic force on piston 32 acting to the left, as viewed in FIG. 3, which will produce periodic opening of ball valve 33 and a consequent rise in the level of pressure supplied to the rod end of actuator 15.

Figure 4:
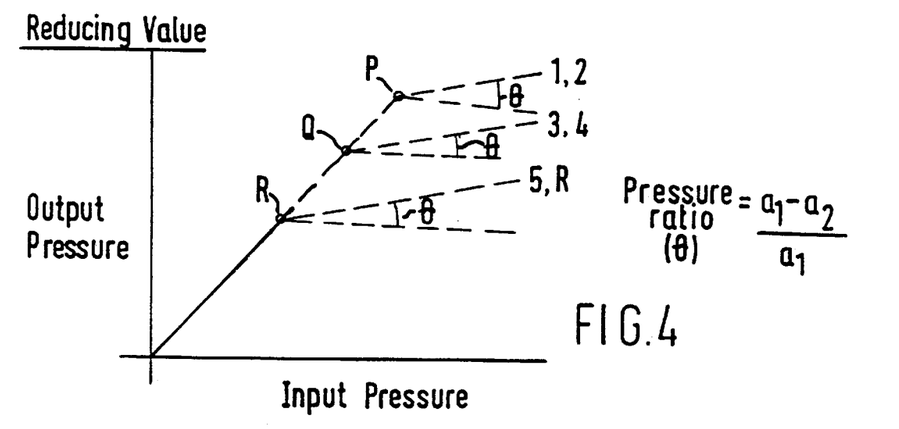
FIG. 4 shows graphically the operating characteristic of the pressure reducing valve of FIG. 3.

After the initial seating of ball valve 33, any further increase in the pressure supplied to the rod end of actuator is in accordance with the area ratio (a1–a2)/a1 and is shown as the gradient θ in FIG. 4 which is a graphical representation of the pressure characteristics of valve 24.

As will be appreciated, due to the higher spring force applied by spring 31 in the lower ratios 1 and 2 the initial seating of ball valve 33 occurs at a higher pressure level P (see FIG. 4) than the pressures Q and R at in which the ball valve 33 initially seats when shift rails 12 and 13 respectively are in operation.

Figure 5:
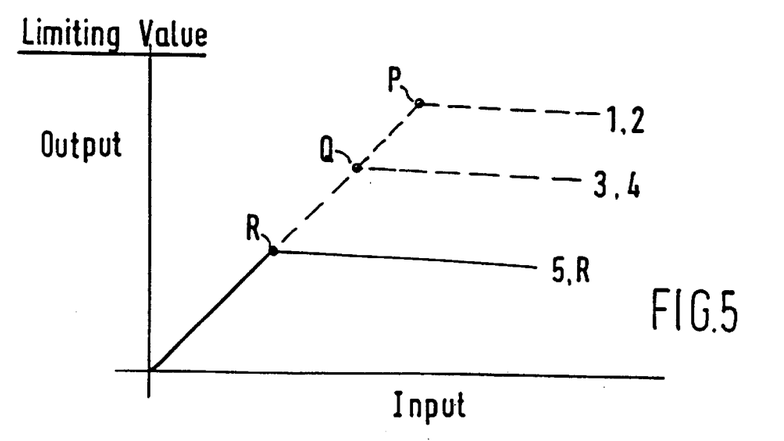
FIG. 5 shows graphically the operating characteristic of an alternative pressure limiting valve.

As an alternative, valve 24 can be designed as a pressure limiting valve in which after the initial closure of the valve there is no further increase in level of pressure supplied to the rod end of actuator 15. Such a valve operating characteristic is shown in FIG. 5 and can most easily be achieved by modifying the valve of FIG. 3 to the arrangement shown diagrammatically in FIG. 6 in which the effect of the pressure in chamber 39 is neutral on the displacement of piston 32 due to the balanced nature of the annular areas A exposed to the pressure in chamber 39.

Figure 6:
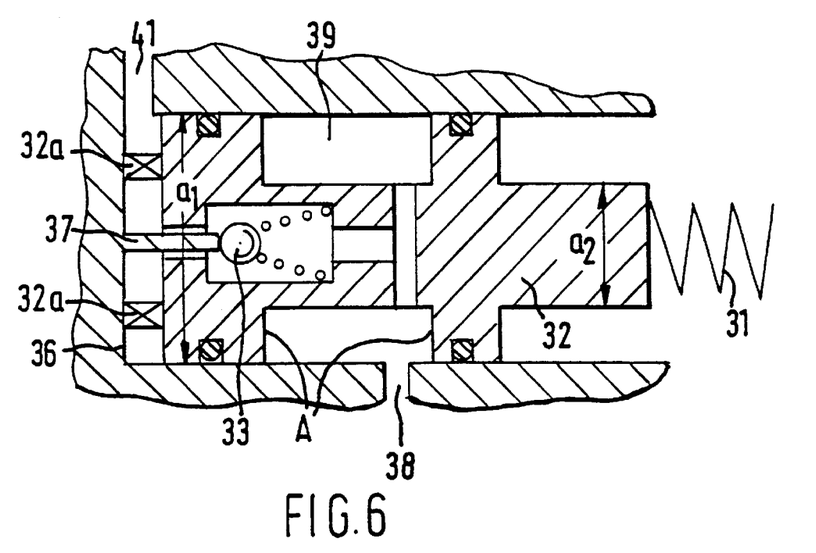
FIG. 6 shows diagrammatically a suitable form of pressure limiting valve.
Figure 7:
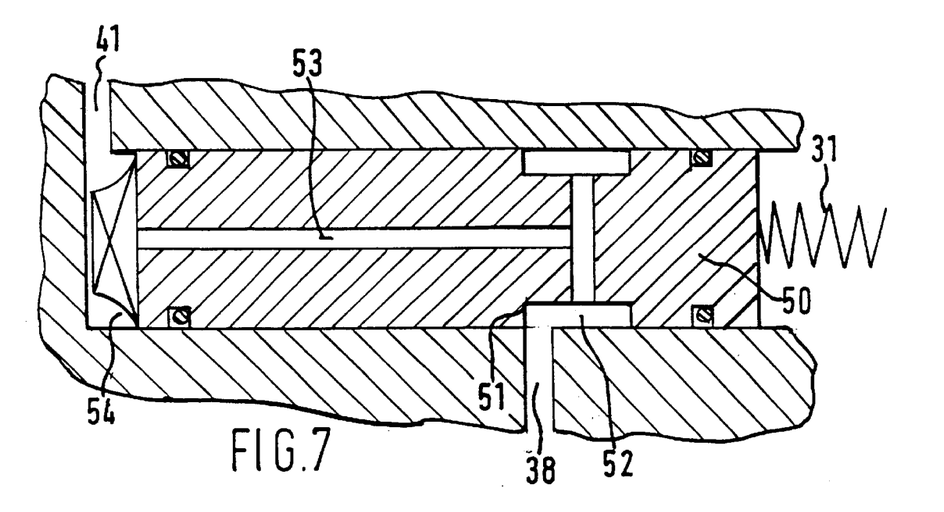
FIG. 7 diagrammatically illustrates the basic constructional details of an alternative spool-type pressure control valve.

It will also be appreciated that instead of the ball-valve arrangement shown in FIGS. 3 and 6 a spool-valve arrangement, as shown diagrammatically in FIG. 7, could be used in which spring 31 acts on one end of a spool member 50. Edge 51 of an annular groove 52 in spool 50 cooperates with inlet port 38 to cut-off the flow of fluid along drilling 53 in spool 50 when the pressure applied to the outlet end 54 of spool 50 has risen to a level sufficient to displace spool 50 to the right against the action of spring 31. As will be appreciated the spool-valve arrangement shown in FIG. 7 operates as a pressure limiting valve in view of the balanced nature of the groove 52 of the spool.

Although the selector mechanism of the present invention has been described above in relation to a transmission in which the ratio selection is done manually by the vehicle operator moving a ratio selector lever and, by implication, manually operating an associated drive line clutch, it will be appreciated that the present invention is also applicable to semi-automatic transmission of the type described, for example in the Applicant's earlier European patents Nos. 0038113,0043660,0059035 and 0101220 in which the ratios are manually selected by the operator and the clutch is operated by an electro-hydraulic control system. The invention is also applicable to fully automated transmissions of the type described for example, in the Applicant's earlier co-pending UK patent application No. 95 02140.8.

Figure 8:
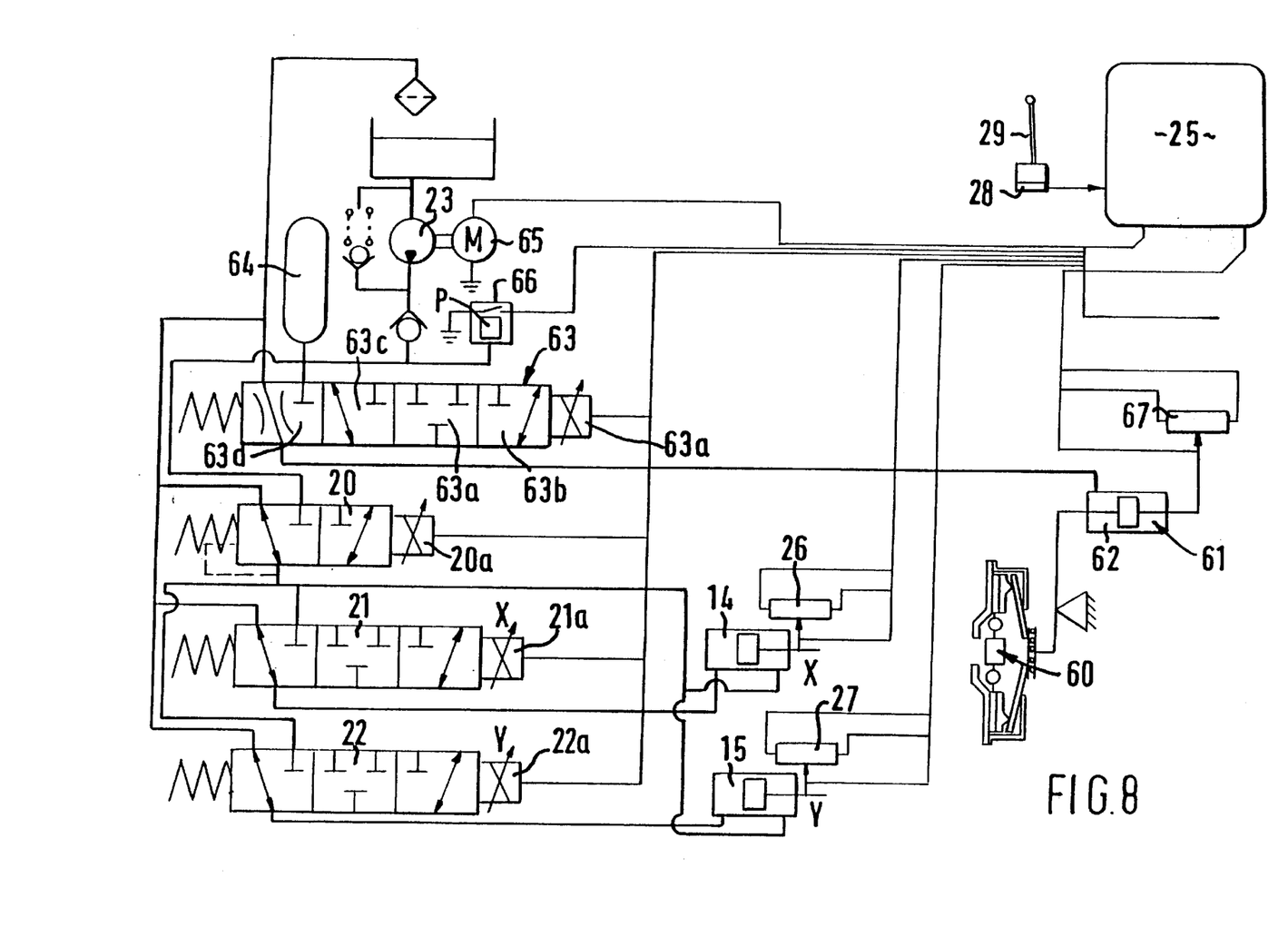
FIG. 8 diagrammatically illustrates an alternative vehicle transmission ratio selector mechanism in which actuator pressure is controlled by an electronically controlled proportional pressure regulating valve.

FIG. 8 shows diagrammatically a selector mechanism (for use with a fully automated transmission) in which components similar in function to the components of FIG. 1 have been similarly numbered.

The master valve 20 shown in FIG. 8 is not a simple on/off valve, as in FIG. 1, but a solenoid-operated proportional pressure regulating valve which outputs fluid at a pressure proportional to the applied solenoid current. Thus, as will be appreciated, the pressure applied to the head ends of actuators 14 and 15 can be varied either in a manner dependant on the gear ratio being selected or at any point in the selection cycle to provide full control over the pressure exerted by the actuators.

Thus the selector mechanism shown in FIG. 8 is not only capable of reducing the pressure supplied to the actuator 15 when selecting a higher ratio of the transmission (as described in the system shown in FIG. 1) but is also capable of controlling the level of fluid pressure applied to both actuators in accordance with additional criteria such as:

A) a requirement to use a different shift loads on one or more synchros in a given transmission which are of a different design to other synchros used in the same transmission;

B) a requirement to have a higher shift load when changing down. This load could be arranged to be higher than the transmission member sustain permanently but which might be required during kickdown in a fully automated transmission which used synchromesh units;

C) a requirement to have a shift load which is sensitive to a selected mode of operation of the associated transmission. For example, if the transmission is operating in "sport" mode quicker and noisier shifts are acceptable than when operating in for example, an "economy" or "winter" mode, and D) a requirement to vary shift load at different points in a given shifting cycle. For example, the shift load may be arranged to be lower up to the point at which the synchronising components come into contact and then higher to actually achieve synchronisation. Alternatively, there may be a requirement to pull out of engagement with a lower shift load than is used for engagement or vice versa.

The system shown in FIG. 8 also provides control over the vehicle clutch 60 to provide a fully automated transmission.

Clutch 60 is disengaged by pressurisation of chamber 62 of a clutch hydraulic actuator 61 which is supplied with pressurised fluid via a control valve 63. Valve 63 is controlled by a solenoid 63a from electronic control unit 25 and has position 63a in which flow of fluid to and from the actuator 61 is cut off, position 63b in which the actuator is supplied with pressurised fluid from pump 23, position 63c in which the pressure in actuator 61 is vented back to sump, and position 63d in which the venting back to sump is via a restriction to provide a slow engagement of the clutch. Position 63d is automatically assumed in the event of an electrical/electronic failure to ensure a slow engagement of the clutch which is the default condition of the system.

The control system also includes an accumulator 64, electric motor 65 which drives pump 23 and a pressure switch 66 which opens to turn off the pump when the accumulator pressure reaches a predeternined level.

The operating position of clutch actuator 61 is fed back as an input to the electronic control unit 25 from a sensor 67.

Since the control of clutch 60 via valve 63 does not form part of the present invention it will not be further described in this application. The reader is directed to the Applicant's previously referred to patents and pending application if further details of the control of clutch 60 are required.

Figure 9:
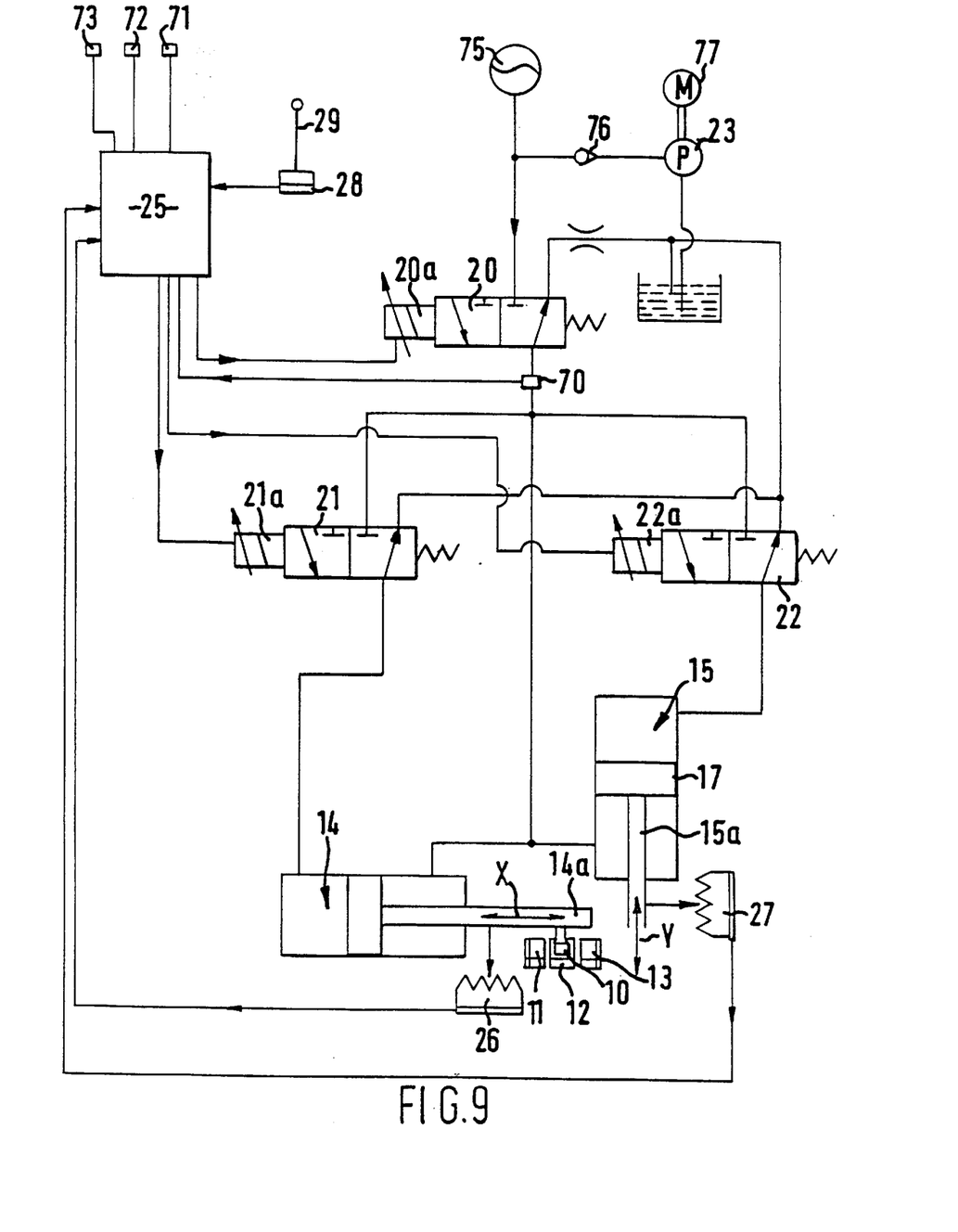
FIG. 9 diagrammatically illustrates a further vehicle transmission ratio selector mechanism in which actuator pressure is controlled by electronically controlled proportional flow valves and an associated pressure transducer.

FIG. 9 shows a still further form of the present invention which again uses electronic monitoring of the control valves to enable the actuator pressure to be varied at any point in the ratio selection cycle. In FIG. 9 components of a similar function to those shown in FIG. 1 have been similarly numbered.

In FIG. 9 valve 20 is a master proportional flow valve which receives pressurised fluid from a circuit which includes pump 23 and an accumulator 75 which is charged via a one way valve 76, with a "blow off" valve 78 to protect from overcharging of accumulator pressure.

Master valve 20 supplies fluid to secondary proportional flow valves 21 and 22 and also to the rod-end of each actuator 14 and 15. A pressure transducer 70 is provided in the connection between master valve 20 and the rod end of actuators 14 and 15.

Master valve 20 and proportional flow valves 21 and 22 are all controlled from electronic control unit 25 which not only issues electrical control signals to the solenoids 20a, 21a and 22a of the valves but received signal inputs from potentiometers 26 and 27 which indicate the position of associated operating rods 14a and 15a and also a signal from a sensor 28 associated with a ratio selector lever 29 which is moved within the ratio selection gate shown in FIG. 2 to select the desired ration of the associated transmission. Addition inputs to control unit 25 are also described below. Thus, in response to the movement of selector lever 29 to select a desired ratio in the associated transmission, the sensor (or sensors) 28 outputs a signal to control unit 25 which is processed by control unit 25 and results in the emission of a signal to the solenoid 20a of master valve 20 to supply pressurised fluid to valves 21 and 22 and also to the rod end of both actuators 14 and 15.

Dependent on the required movement of selector member 10 and the associated operating rods 14a and 15a, valves 21 and 22 are operated by the control unit 25 in the appropriate sequence to give the appropriate movement of operating rods 14a and 15a in the appropriate sequence.

Initially operating rod 14a is moved in direction X to engage the appropriate shift rail followed by movement of operating rod 15a to displace the shift rail currently engaged by the selector member 10 in direction Y to engage the selected ratio.

In accordance with the present invention the master valve 20 and valves 21 and 22 are solenoid-operated proportional flow control valves which output fluid at a flow rate proportional to the applied solenoid current.

By controlling the flow rate (very accurately and quickly) through the master valve 20, pressure to the valves 21 and 22 can be controlled. If pressure is too high, fluid flow into the system is reduced, or vented, so that overall fluid volume in the gear selector mechanism is reduced, and vice versa.

Thus, as will be appreciated, by controlling the flow rate through these valves the pressure applied to the head ends of actuators 14 and 15 can be varied either in a manner dependant on the gear ratio being selected or other predetermined criteria at any point in the selection cycle to provide full control over the pressure exerted by the actuators.

Thus the selector mechanism is not only capable of reducing the pressure supplied to the actuator 15 when selecting a higher ratio of the transmission but is also capable of controlling the level of fluid pressure applied to both actuators in accordance with additional criteria A) to D) referred to above in relation to FIG. 8.

Figure 10:
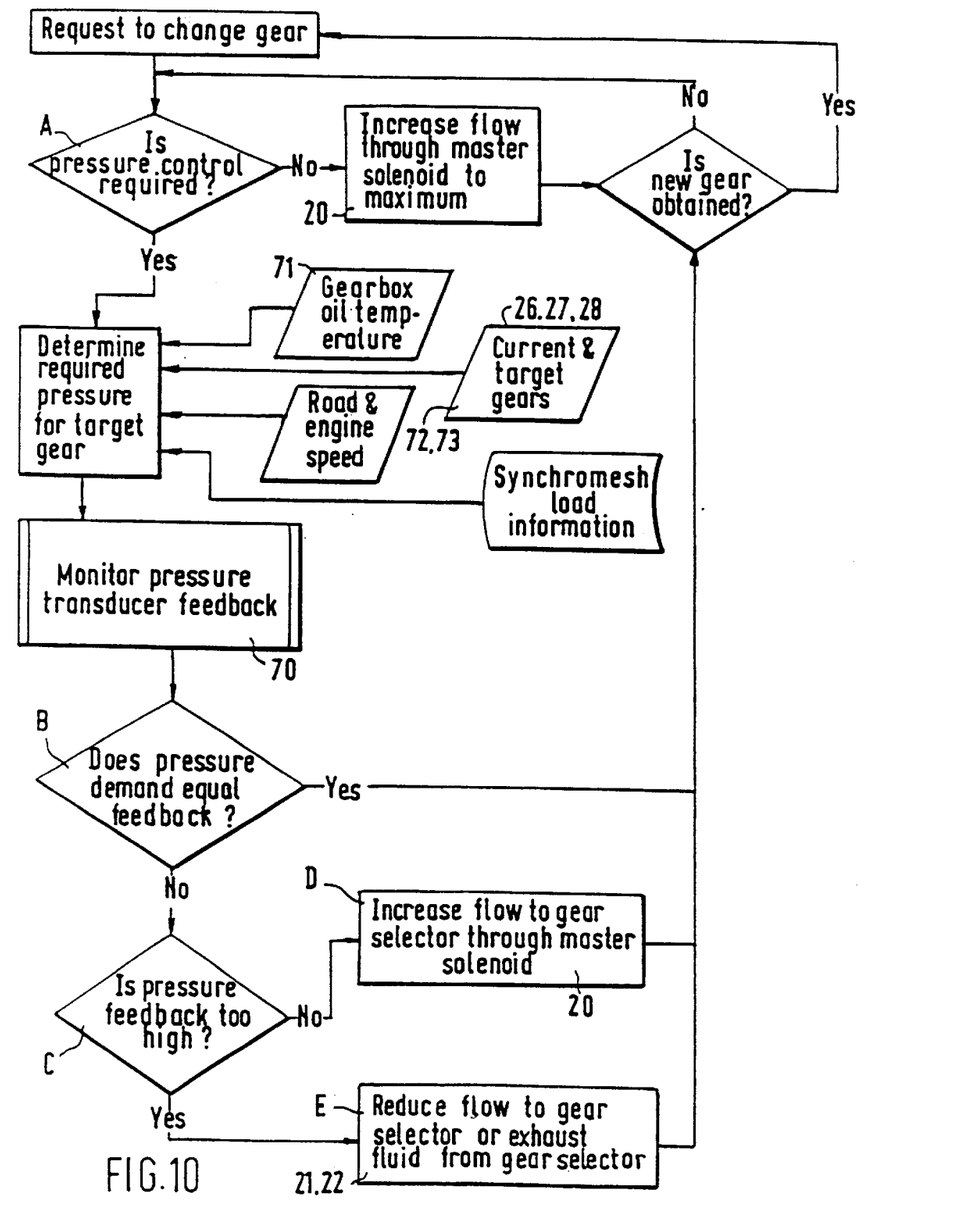
FIG. 10 is a flow chart of the decision process used to control the mechanism of FIG. 9.

Additionally as can be seen from FIG. 10 (which is a largely self explanatory flow-chart of the decision process used in the control of the pressure applied to actuators 14 and 15) other criteria such as transmission oil temperature and road and engine speed can be used as determining factors in the pressure level applied to actuators 14 and 15. Oil temperature is sensed by sensor 71, road speed by sensor 72 and engine speed by sensor 73 or can be obtained by other means, such as a CAN (controller area network) on the vehicle.

Control unit 25 in addition to receiving inputs from sensors 71,72 and 73 also receives information as to the current gear engaged in the transmission from potentiometers 26 and 27 which are associated with shift rails 11,12 and 13 and has memory locations where other operating parameters [such as the loads to which each synchronizer in the transmission should be subjected at each point in its operating cycle] are stored.

Signals from pressure transducer 70 which are fed back to control unit 25 are used to control the flow openings of valves 20,21 and 22 and hence the pressure applied to actuators 14 and 15 when the system determines that control of the pressure supplied to actuators is required (see decision box A of FIG. 3).

In box B of FIG. 3 a comparison is made between the feedback signal from pressure transducer 70 and the actuator pressure level which the control unit 25 has determined is currently appropriate from all the criteria under consideration. In box C and action boxes D and E the appropriate adjustment of fluid flow is made dependant on the result of the current versus appropriate pressure comparison.

It is also possible to use pressure transducer 70 to monitor the pressure currently held in accumulator 75. This removes the need to employ a seperate accumulator pressure monitor. Accumulator pressure can be monitored by transducer 70 when valves 21 and 22 are closed in the so-called "null" position in which no flow ia allowed into or out of actuators 14 and 15 and when the master valve 20 is also fully open. The control unit 25 can be arranged to set-up the above accumulator pressure testing condition on a regular basis when the selector mechanism is not required for the execution of a ratio selection in the associated transmission.

Although the selector mechanism of FIG. 9 has been described above in relation to a transmission in which the ratio selection is done manually by the vehicle operator moving a ratio selector lever and, by implication, manually operating an associated drive line clutch, it will be appreciated that the FIG. 9 construction is also applicable to semi-automatic transmission of the type described, for example in the Applicant's earlier European patents Nos. 0038113,0043660,0059035 and 0101220 in which the ratios are manually selected by the operator and the clutch is operated by an electro-hydraulic control system. The construction is also applicable to fully automated transmissions of the type described for example, in the Applicant's earlier co-pending UK patent application No. 95 02140.8.

For example, the system shown in FIG. 9 can also provide control over the associate vehicle clutch to provide a fully automated transmission in the manner described above in relation to FIG. 8.

Also, although in the arrangement of FIG. 9 the secondary valves 21 and 22 are proportional flow valves these valves could be of the cheaper on/off type with the volume flow rate of the system being controlled by master valve 20.

We claim:

1. A ratio selector mechanism for the selection of the operative ratio in a associated synchromesh vehicle transmission in which fluid pressure operated actuating means operates synchromesh units, the mechanism including a first fluid pressure operated actuator which moves a selector member in a first direction to engage one of a number of ratio shift rails, a second fluid pressure operated actuator which moves the selector member in a second direction to longitudinally displace the engaged shift rail to engage an associated selected ratio, and a valve member which acts against a bias force which is varied in dependence on the position of the first actuator to control the level of pressure supplied to the second actuator.

2. A mechanism according to claim 1 characterised in that the pressure applied to the second actuator, which determines the force used in actually engaging the selected ratio, is lowered when the first actuator is in engagement with a shift rail associated with the higher ratios of the associated vehicle transmission.

3. A mechanism according to claim 1 characterised in that an abutment which moves with the first actuator bears on a spring which biases the valve member towards a closed position, movement of the first actuator thus varying the effective bias force of the spring.

4. A mechanism according to claim 1 characterised in that the valve member is designed to operate as a pressure reducing valve.

5. A mechanism according to claim 1 characterised in that the valve member is designed to operate as a pressure limiting valve.

6. A mechanism according to claim 1 characterised in that the source of pressurised fluid comprises a pump which charges an accumulator which is connected with the master control valve and in that the pressure transducer is sited on the actuating means side of the master control valve but is connectable via the master control valve with accumulator pressure on the supply side of the master control valve, when the mechanism is not effecting a ratio selection, to monitor accumulator pressure.

7. A mechanism according to claim 1 characterised in that the pressure supplied to the actuating means is controlled in response to one or more of the following criteria:

a) shift load required for the currently operative synchro;

b) operative mode of the associated transmission;

c) current point in the current ratio selection cycle;

d) transmission oil temperature, and e) road or engine speed of associated vehicle.

8. A ratio selector mechanism according to claim 1 characterised in that the selection of the operative ratio is made manually by the movement of a ratio selector member by a vehicle operator.

9. A ratio selector mechanism according to claim 1 characterised in that the selection of the operative ratio is made automatically by electronic control means in accordance with predetermined vehicle operating criteria.

10. A transmission control system characterised by the inclusion of a ratio selector mechanism according to claim 1 and a clutch control system in which a main drive line clutch is disengaged and engaged by a clutch actuator under the control of electronic control means in accordance with predetermined vehicle operating parameters.

11. A ratio selector mechanism for the selection of the operative ratio in a associated synchromesh vehicle transmission in which fluid pressure operated actuating means operates synchromesh units, said mechanism including a first fluid pressure operated actuator which moves a selector member in a first direction to engage one of a number of ratio shift rails, a second fluid pressure operated actuator which moves the selector member in a second direction to longitudinally displace the engaged shift rail to engage an associated selected ratio, fluid pressure being supplied to said first and second actuators via a solenoid operating master control valve which operates as a proportional flow valve and in that a pressure transducer is provided which senses the pressure level supplied to said first and second actuators and whose output is fed to an electronic control means which issues signals to the solenoid of the master control valve to control fluid pressure to the first and second actuators in accordance with predetermined transmission or vehicle operating criteria.

* * * * *